Aug. 20, 1957 T. W. JOHNSON ET AL 2,803,194
PUMP ASSEMBLY AND MEANS FOR COOLING THE BEARINGS THEREOF
Filed Feb. 4, 1953
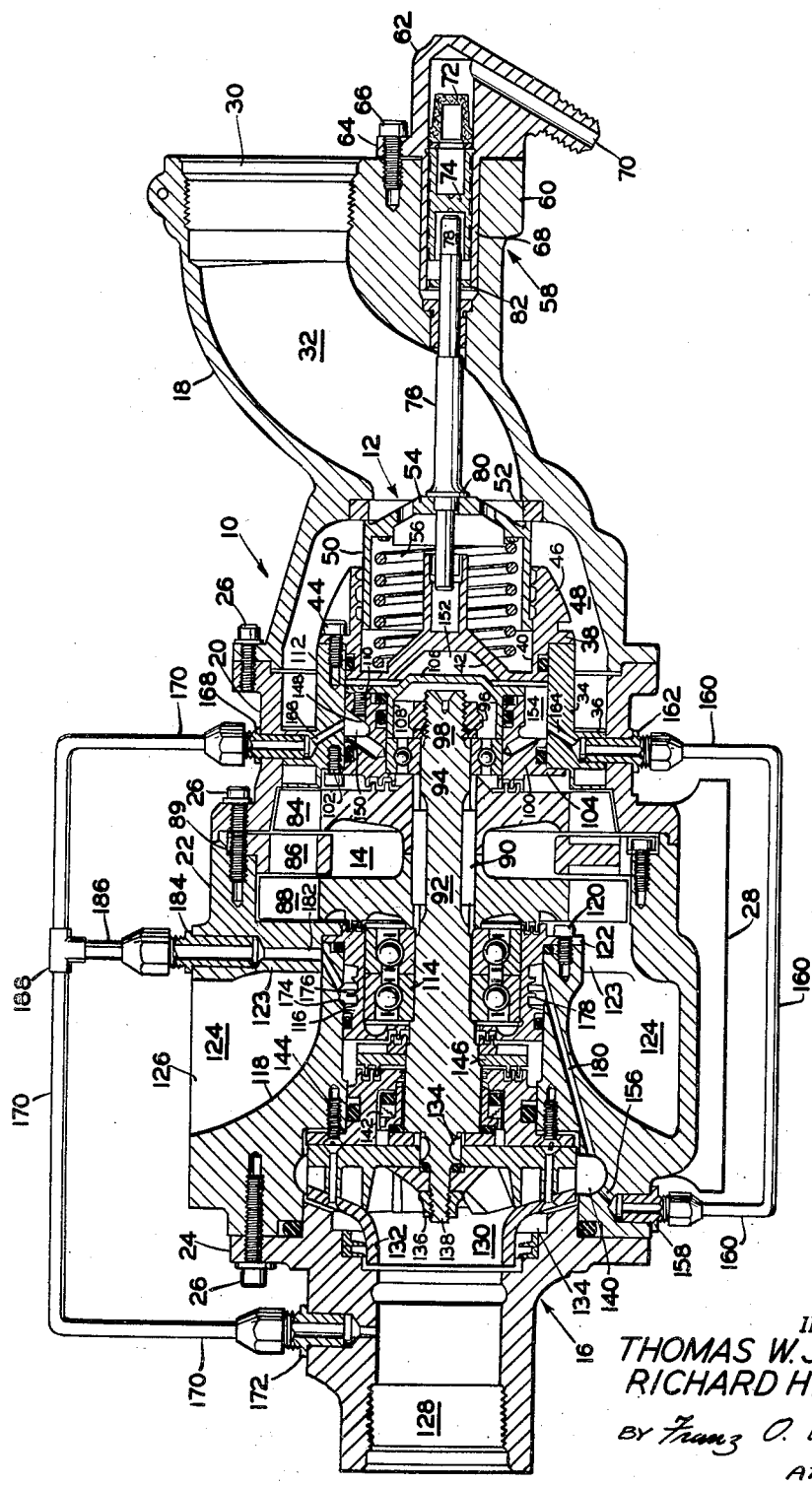
INVENTORS
THOMAS W. JOHNSON
RICHARD H. WOLFF
BY Franz O. Ohlson, Jr.
ATTORNEY United States Patent Office 2,803,194
Patented Aug. 20, 1957

2,803,194

PUMP ASSEMBLY AND MEANS FOR COOLING THE BEARINGS THEREOF

Thomas W. Johnson, Westfield, and Richard H. Wolff, Maywood, N. J., assignors to Bendix Aviation Corporation, Teterboro, N. J., a corporation of Delaware Application February 4, 1953, Serial No. 335,068

6 Claims. (Cl. 103—87)

This invention relates in general to pump assemblies and more particularly has to do with an improved pump assembly including a novel cooling system for the bearings thereof.

It has become common practice in the design and construction of certain types of pump assemblies to provide a cooling system for the bearings of the assembly to prevent overheating of the bearings. For example, copending application Serial No. 208,882, filed in the name of Richard H. Wolff and Thomas W. Johnson on February 1, 1951, now Patent No. 2,752,856, discloses and claims a turbine driven pump assembly wherein the bearing cooling system utilizes ambient air as the coolant.

The present invention, however, contemplates and has for one of its objects the provision of an improved pump assembly including a novel cooling system for the bearings of the assembly wherein the fluid being pumped is utilized as the coolant.

The instant invention also has for one of its objects the provision of an improved pump assembly including a novel cooling system of the above type wherein the pressure drop across the pumping unit is utilized to circulate the coolant through the system to the end that additional or auxiliary pumping means for the cooling system is not required.

To the above ends, the novel pump assembly contemplated herein proposes to mount the bearings of the assembly in bearing retainers or housings having channels or passageways that communicate through conduits with the discharge or high pressure side of the pumping unit and also with the inlet side thereof. Thus, the pressure drop across the pumping unit serves to circulate the fluid being pumped as a coolant through the conduits and the passageways of the bearing housings to thereby cool the bearings.

The above and other objects and advantages will appear more fully hereinafter from a consideration of the detailed description which follows taken together with the accompanying drawing wherein one embodiment of the present invention is shown by way of example. It is to be expressly understood, however, that the drawing is for purposes of illustration only and is not to be construed as defining the scope of the invention.

The drawing is a longitudinal section through the novel pump assembly contemplated therein and showing in particular the novel cooling system for the bearings of the assembly.

Referring now to the drawing, the novel pump assembly contemplated herein comprises, in general, a casing or housing 10 in which is mounted, in axial alignment, a valve assembly 12, a two-stage turbine unit of the impulse type 14 and a pump unit 16.

As shown in the drawing, the housing 10 comprises an end section 18, intermediate sections 20 and 22 and an end section 24, that are joined together by suitable fastening means such as bolts 26, to form a unitary housing 10. A base or mounting plate 28, integrally formed with the intermediate section 22, affords means whereby the pump assembly may be secured to a supporting structure.

End section 18 is provided at one end thereof with an inlet 30 that is adapted to be detachably connected to a source of high-energy operating fluid such as the discharge from compressor of an engine, and a conduit 32 formed in section 18 leads from the inlet 30 to valve assembly 12. A hollow mounting block 34 having radially disposed blades 36 formed integrally therewith, is centrally positioned by blades 36 within the housing 10. A cup-like member 38 having a cylindrical section 40 closed by an end wall 42 receivable in block 34, is secured to block 34 by bolts 44, only one of which is shown. Member 38 also includes a frusto conical section 46 the outer surface of which forms a continuation of the outer surface of block 34. A portion of block 34 and frusto conical section 46 extend into the end section 18 and cooperate therewith to form an annular conduit 48 that is adapted to receive the operating fluid from conduit 32. Blades 36 are so disposed relative to each other and around the periphery of the block 34 so as to form nozzles that direct the operating fluid from the annular conduit 48 to the turbine unit 14.

Valve assembly 12 which controls communication between conduits 32 and 48 and the actuating means therefore, is fully set forth and claimed in the aforenoted copending application Serial No. 208,882. For present purposes, valve assembly 12 comprises a cylindrical member or sleeve 50 that is slidably received within cup member 38 and which is adapted to sealingly engage an annular valve seat 52 fixedly secured by suitable means, not shown, in the end section 18 at the terminals of the conduit 32. The outer end of sleeve 50 and valve seat 52 are provided with flat surfaces that cooperate to afford a substantially leakproof engagement between the sleeve 50 and its coacting seat 52. Adjacent the outer end, thereof, sleeve 50 is provided with a head or end plate 54 and a compression spring 56 operating between head 54 and the end wall 42 biases the sleeve in a direction to engage at the flat surface thereof with the flat surface of the valve seat to close valve assembly 12.

An actuator assembly generally designated by the reference character 58 is mounted in a boss 60 formed on the end of the end section 18 adjacent inlet 30. Actuator assembly 58 comprises a housing 62 having a flange 64 mounted by a bolt 66 to the end section 18 and a cylindrical section 68 adapted to be received into a recess formed in boss 60. An inlet 70 admits fluid under pressure from a suitable control station (not shown) into housing 62 where the fluid passes through a suitable filter element 72 into section 68 where it acts upon a piston 74 slidably mounted therein. A valve stem or rod 76 having one end 78 loosely received within recess in piston 74 to prevent binding in the event of misalignment of piston 74 and rod 76 is connected at its opposite end through a shoulder 80 with end plate 54 of sleeve 50.

A spacer or shim 82 slidably mounted on the rod 76 within the cylinder 68 limits the stroke of piston 74 within the cylinder to thereby limit the movement of the valve sleeve 50 into the member 38. Thus, by selecting a shim or spacer 82 of the proper thickness, the travel of sleeve 50 and hence the opening between conduits 32 and 48 may be varied to any selected size.

The turbine unit 14 is of the two stage impulse type and comprises a first stage turbine wheel 84, a stator ring 86 and a second stage turbine wheel 88. The stator ring 86 is provided with a peripheral flange 89 adapted to receive the bolts 26 to thereby mount the stator ring between the intermediate sections 20 and 22 and operatively position the same between turbine wheels 84 and 88, respectively. Turbine wheels 84 and 88 are fixedly mounted by a common key 90 to a shaft 92.

Shaft 92 is rotatably supported at one end by a conventional anti-friction bearing 94 that is mounted on the shaft and which has its inner race clamped between the hub of turbine wheel 84 and a nut 96 engaged with a threaded end 98 of shaft 92. The outer race of bearing 94 is received in a bearing retainer 100 that is positioned in block 34. Retainer 100 is secured to block 34 by bolts 102 which pass through a peripheral flange 104 formed on the former into suitably threaded sockets formed in the latter. Retainer 100 is provided with an inwardly disposed shoulder that engages one side of the outer race of bearing 94, while a cap 106 is provided with a cylindrical skirt 108 that extends into retainer 100 to have its inner edge engage the opposite side of the outer race. Cap 106 is secured to retainer 100 by suitable means such as bolts 110, only one of which is shown, that pass through a flange 112 formed on cap 106 into suitably threaded sockets in retainer 100. Bearing 94 is, therefore placed in heat conducting relationship with bearing retainer.

Shaft 92 is also rotatably supported intermediate its ends by a pair of conventional anti-friction bearings 114 that are mounted on shaft 92 and which have their inner races clamped between a shoulder formed on shaft 92 and the hub of turbine wheel 88. Bearings 114 are mounted in a bearing retainer 116 and in heat conducting relationship therewith. Retainer 116 is mounted in a hollow support element 118 and is secured in position by suitable means such as bolts 120 that pass through a flange 122 on the retainer into suitably threaded sockets in element 118.

Support element 118 is disposed in casing 10 in axial alignment with block 34. The end of element 118 adjacent turbine wheel 84 is joined to section 22 by a plurality of radial arms 123. Support element 118 also serves to define within section 22 a substantially annular conduit 124 that receives the operating fluid exhausting from the second stage turbine wheel 88 and conducts same to a suitable exhaust outlet 126 formed in section 22.

Pump unit 16 includes an inlet 128 formed in end section 24 that is adapted for detachable connection to a source of fluid such as the fuel supply of an engine. Inlet 128 communicates with the axial inlet 130 of an impeller 132 mounted in an impeller chamber 134 formed in intermediate section 22 and end section 24. Impeller 132, which may be of the balanced type described and claimed in copending application Serial No. 128,813 and now U. S. Patent No. 2,641,190 filed in the name of Thomas W. Johnson on November 22, 1949, is operatively connected to shaft 92 by means of a key 134 and a nut 136 engaged with a threaded end 138 of shaft 92.

Upon rotation by shaft 92, impeller 132 draws fluid at a low pressure through inlet 128 into the impeller from whence it is discharged at a relatively high pressure into a volute or outlet conduit 140 formed in intermediate section 22 and which communicates with a suitable outlet (not shown) for pump unit 16.

To prevent the leakage of fluid from impeller chamber 134 along shaft 92 to bearings 114, a conventional carbon type seal, generally indicated by reference character 142 is mounted to support element 118 by suitable securing means such as bolts 144. Additional sealing means are provided in the form of a conventional slinger type seal 146 that discharges through a suitable conduit (not shown) in section 22 to a drain.

The use of a multi-stage turbine such as turbine unit 14 to drive a pump unit such as pump unit 16 is more fully set forth and claimed in copending application Serial No. 320,253 filed in the name of Thomas W. Johnson on November 13, 1952, now Patent No. 2,750,892.

To provide a cooling system for bearing 94, a peripheral channel 148 formed in retainer 100 cooperates with the adjacent surface of block 34 to form a peripheral passageway 150. As shown in the drawing, cap 106 and end wall 42 of member 38 are spaced from each other to define a compartment 152 that communicates through a plurality of registered ducts 154 in cap 106 and retainer 100 (only one of which is shown) with peripheral passageway 150. To supply fluid from the outlet or high pressure side of pump unit 16 to passageway 150 and compartment 152, a duct 156 formed in section 22 communicates outlet volute 140 with an outlet fitting 158 suitably mounted in section 22. Outlet fitting 158 communicates through a suitable conduit or line 160 with an inlet fitting 162 mounted in section 20 and which communicates through a duct 164 formed in section 20 with passageway 150.

To return fluid from passageway 150 and compartment 152 to the inlet or low pressure side of pump unit 16, a duct 166 formed through block 34 and one of the vanes 36 communicates passageway 150 with an outlet fitting 168 suitably mounted in intermediate section 20. A return conduit 170 connects outlet fitting 168 with an inlet fitting 172 mounted in end section 24 and which opens into inlet 128. The cross-sectional area of duct 156 is designed to the end that the duct serves as an orifice to control the pressure of the fluid delivered from outlet conduit 140 to outlet fitting 158. Thus, the fluid is circulated at a relatively low pressure through the cooling system.

To provide a cooling system for bearings 114, retainer 116 is provided with a peripheral channel 174 that cooperates with the adjacent wall or surface of element 118 to define a peripheral passageway 176. Channel 174 is formed in retainer 116 so as to provide cooling vanes 178 that extend into passageway 176. Fluid from the outlet or high pressure side of pump unit 16 is delivered to passageway 176 through a duct 180 formed in intermediate section 22, and is returned to the inlet or low pressure side of the pump unit 16 by means of a duct 182 formed in support element 118 and one of the radial arms 123 that communicates passageway 176 with an outlet fitting 184 suitably mounted in end section 22. Outlet fitting 184 in turn is connected through a suitable conduit 186 and T fitting 188 with return conduit 170.

As in the instance of duct 156, duct 180 is formed so as to serve as an orifice to control the pressure of the fluid circulating through the cooling system for bearings 114.

Having thus described the details of construction and arrangement of the novel pump assembly and cooling system for the bearing thereof as contemplated herein, it will be apparent to one skilled in the art that when inlet 30 is connected to a source of operating fluid such as an engine driven compressor, the operating fluid passes through conduit 32 to valve assembly 12. Upon the operation of actuating assembly 58 to open valve assembly 12, rod 76 moves sleeve 50 to disengage the same from valve seat 52 thereby permitting the operating fluid to pass into conduit 48 from whence it is delivered through the nozzles formed by vanes 36 to turbine wheels 84 and 88 to rotate the same and thus rotate shaft 92. The discharge on exhaust from second stage turbine wheel 88 passes through conduit 124 to exhaust outlet 126.

The rotation of shaft 92 rotates impeller 132 to the end that fluid at a low pressure is drawn into the impeller and discharged therefrom at a high pressure into outlet volute 140 from whence it is delivered to the outlet, not shown, for the pump unit 16.

A portion of the high pressure fluid in outlet conduit 140 passes through duct 156, outlet fitting 158, conduit 160, inlet fitting 162 and duct 164 into passageway 150 and through ducts 154 into compartment 152. The fluid circulates through passageway 150 and compartment 152 where it serves to cool retainer 100 and hence bearing 94. The fluid is then returned through duct 166, outlet fitting 168, conduit 170 and inlet fitting 172 into the inlet 128 of pump unit 16.

Similarly, a portion of the high pressure fluid in outlet conduit 140 passes through duct 180 into passageway 176 to circulate through the passageway and over vanes 178 where it serves to cool retainer 116 and hence bearings 114. The fluid is returned through duct 182, outlet fitting 184 and conduit 186 into conduit 170 from whence it passes through inlet fitting 172 into inlet 128 of pump unit 16.

Thus, due to the foregoing arrangement a portion of the fluid being pumped is circulated as a coolant from the high pressure side of pump unit 16 through the bearing retainers 100 and 116 and is returned to the low pressure or inlet side of pump unit 16. It is manifest, therefore, that circulation through the system aforesaid is produced by the pressure drop across pump unit 16 as controlled by the orifice ducts 156 and 180 and no other pumping means for the coolant is required.

It is understood, of course, that under certain conditions, for example, in a pump unit having a relatively low outlet pressure, the ducts 156 and 180 need not be formed as orifices but may be formed to permit full pump discharge pressure to circulate the fluid.

Although only one embodiment of the novel pump assembly and means for cooling the bearings thereof has been shown and described, it is understood that various changes and modifications in the form and relative arrangements of the parts, which will be apparent to those skilled in the art, may be made without departing from the spirit and scope of the present invention.

Moreover, it is understood that various other means for driving pump unit 16 may be employed other than turbine unit 14 and that the cooling passageway in bearing retainers 100 and 116 may be formed in many other ways, for example directly in the retainers.

What is claimed is:

1. In a pump assembly including a fluid pumping unit having an inlet and an outlet and a plurality of bearing means rotatably supporting a shaft which carries said pumping unit, the combination with said bearing means of bearing retainers having peripheral channels therein and being in continuous metallic heat conducting relationship with said bearing means, said peripheral channels having extended surfaces therein directly over said bearing means, and separate passageways for circulating separate portions of the fluid being pumped directly from said outlet completely through each of said channels and then to the inlet of said pumping unit.

2. The combination according to claim 1 and being further characterized in that means are provided for supporting and housing said retainers and each of said means for supporting and housing has opposed inlet and outlet therein connecting with said peripheral channels.

3. The combination according to claim 1 and being further characterized in that said separate passageways include means for reducing the pressure of the fluid received from said outlet of the pumping unit.

4. In a pump assembly the combination comprising a chamber having an inlet and an outlet, an impeller pump in the chamber operative upon rotation to pump a fluid from the inlet to the outlet, a shaft axially connected to the impeller pump, casing structure forming an axial chamber for turbine means, gas driven turbine means in said chamber and mounted on the shaft and adapted to rotate the same and thereby the impeller pump, vanes upstream of said turbine means and radial arms downstream of said turbine means, separate bearing means rotatably supporting said shaft on either side of the turbine means, separate retainer means housing and being in continuous metallic contact with each of said bearing means, support means housing said retainer means, said vanes and said radial arms being secured to the adjacent parts of said casing structure and to the respective support means housing said separate retainer means, passageway means in each of the retainer means and having extended surfaces extending in the direction of said bearing means, separate lateral conduits communicating the chamber outlet through said support means to the passageway means in each of the retainer means, and separate return conduits for communicating the fluid circulated to the passageway means in each of the retainer means back through said support means to a common conduit leading to the inlet of such pump chamber.

5. The combination according to claim 4 and being further characterized in that said return conduits include ducts in said vanes and said radial arms.

6. The combination according to claim 4 and being further characterized in that means providing an end cap chamber is in fluid flow communications with the passageway means of the upstream bearing retainer.

References Cited in the file of this patent

UNITED STATES PATENTS

| | | |
|---|---|---|
| 1,787,088 | Schlyer | Dec. 30, 1930 |
| 2,301,063 | McConaghy | Nov. 3, 1942 |
| 2,479,573 | Howard | Aug. 23, 1949 |
| 2,592,294 | Korn | Apr. 8, 1952 |
| 2,606,501 | Dreibelbis | Aug. 12, 1952 |
| 2,632,395 | Jennings et al. | Mar. 24, 1953 |

FOREIGN PATENTS

| | | |
|---|---|---|
| 404,246 | Germany | Oct. 17, 1924 |
| 630,792 | Great Britain | Oct. 21, 1949 |